(12) United States Patent
Lee et al.

(10) Patent No.: US 6,630,061 B2
(45) Date of Patent: Oct. 7, 2003

(54) APPARATUS FOR GENERATING A MIXTURE GAS OF OXYGEN AND HYDROGEN

(76) Inventors: Jae-Heung Lee, #404 Dongnam-Apt., Mansoo 5-dong, Namdong-Gu, Incheon-shi (KR); Yung-Kil Jun, 3-22 Cheongpa-Dong 1Ga, Yongsan-Gu, Seoul (KR); Jung-Hi Kim, 303 Cheongovilla, Daechi-Dong, Gangnam-Gu, Seoul (KR)

( * ) Notice: Subject to any disclaimer, the term of this patent is extended or adjusted under 35 U.S.C. 154(b) by 98 days.

(21) Appl. No.: 09/800,809

(22) Filed: Mar. 7, 2001

(65) Prior Publication Data

US 2001/0009223 A1 Jul. 26, 2001

(30) Foreign Application Priority Data

Oct. 24, 2000 (KR) .......................... 2000-62692
Jan. 15, 2001 (KR) .......................... 2001-2185

(51) Int. Cl.[7] ............................. C25B 9/00; C25B 15/00
(52) U.S. Cl. ...................... 204/270; 204/239; 204/274
(58) Field of Search .............................. 204/277, 278, 204/241, 274, 270

(56) References Cited

U.S. PATENT DOCUMENTS

| | | | | |
|---|---|---|---|---|
| 5,628,885 A | * | 5/1997 | Lin | 204/228 |
| 5,711,865 A | * | 1/1998 | Caesar | 205/628 |
| 5,733,422 A | * | 3/1998 | Lin | 204/241 X |
| 6,068,741 A | * | 5/2000 | Lin | 204/239 |

FOREIGN PATENT DOCUMENTS

| KR | 1998-117445 | 4/1998 |
|---|---|---|
| KR | 0196437 | 9/2000 |

* cited by examiner

Primary Examiner—Donald R. Valentine
(74) Attorney, Agent, or Firm—Sheridan Ross PC

(57) ABSTRACT

An apparatus for generating a mixture of oxygen gas and hydrogen gas is provided with an electrolytic cell in which electrolysis of electrolyte therein is performed to generate the mixture of the oxygen and the hydrogen gas by electricity being applied from an electrical conversion device and having a plurality of electrode plates arranged with separation, a insulating materials attached to inner wall surfaces of the electrolytic cell and having at least one surface grooves formed thereon into which the electrode plates are inserted, a water supply device for supplementing the water into the electrolytic cell, the water supply device connected to the electrolytic cell, a gas reservoir for restoring the mixture generated in the electrolytic cell, the gas reservoir connected to the electrolytic cell, and a cooling unit for maintaining temperature inside the electrolytic cell constant connected to the electrolytic cell.

18 Claims, 11 Drawing Sheets

APPARATUS FOR GENERATING A MIXTURE GAS OF OXYGEN AND HYDROGEN

FIELD OF THE INVENTION

The present invention relates to an apparatus for generating a mixture gas of oxygen and hydrogen, more particularly, to an apparatus for generating a mixture gas of oxygen and hydrogen wherein an improved configuration of an electrolytic cell is provided for an efficient use of a current supplied thereto and a cooling unit for preventing a temperature of electrolyte from being increased is also provided, thereby producing the mixture of oxygen and hydrogen in a reduced cost.

DESCRIPTION OF THE PRIOR ART

In general, in a conventional gas generation apparatus of a mixture of oxygen and hydrogen, the oxygen and the hydrogen are obtained by electrolysis of water, wherein the water containing a small amount of an electrolyte is supplied to an electrolytic cell provided with a positive electrode and a negative electrode and then a direct current is applied to generate the mixture of the oxygen and the hydrogen of an energy source without being accompanied by any pollution factors. A mole fraction of the oxygen and the hydrogen in the mixture is 2:1. The gas generation apparatus described above is newly in the limelight due to an increase of an interest on the environmental problems.

In this regard, many studies have been made on the gas generation apparatus and a number of gas generation apparatus for generating efficiently much more oxygen/hydrogen have been proposed.

As one of the prior art oxygen/hydrogen generation apparatuses, Korean Utility Model application No. 1998-117445 discloses an electrolytic cell which will be described with reference to FIGS. 1 through 2c. As shown, the apparatus taught by the Korean Utility Model application comprises an electrolytic cell 100, wherein a plurality of electrode plates 101 of a rectangular shape and spacers 102 made of a synthetic resin are alternately laminated and a pair of termination plates 103 are attached to both ends of the electrolytic cell and finally stay bolts 104 and nuts 105 are mounted through.

An O-ring 106 made of rubber is inserted onto an inner peripheral surface of the spacer 102. The space where the O-ring 106 and the electrode plates 101 take up becomes a gas generation chamber 110. The electrode plate 101 has a gas passing hole 101a and an electrolyte passing hole 101b which are formed through one portion and another portion of the plate 101, respectively. The termination plate 103 has a gas connection nipple 107 and an electrolyte connection nipple 108 which communicate with the gas passing hole 101a and the electrolyte passing hole 101b, respectively, and a current connection bolt 109 mounted thereto.

In the electrolytic cell 100 constructed in this manner, when the electric power is connected to the current connection bolt 109, the oxygen and the hydrogen gases are generated from the electrolyte within the gas generation chamber 110 by the electrolysis of the water. The mixture gas is exhausted through the gas passing hole 101a to be charged within a gas reservoir mounted externally. The water is supplied through the electrolyte passing hole 101b for a supplement for the water consumed during the electrolysis.

In the electrolytic cell 100, however, since the gas generation chamber 110 is formed in the space defined with the electrode plates 101 and the O-rings 106, with a radially outer portion of the electrode plate 101 serving as a radiating plate, the gas generation chamber 110 is too smaller with respect to an area of the electrode plate 101, causing the speed of the gas generation to be limited.

Further, since the electrolytic cell 100 scatters the heat generated during the electrolysis by using an air-cooling manner, it does not have an efficient cooling effect. Furthermore, leakage between the O-ring 106 and the electrode plate 101 may degrade the quality of the oxygen and hydrogen mixture gas being produced.

Meanwhile, Korean Utility Model No. 0196437 teaches an apparatus for generating an oxygen/hydrogen mixture gas, which will be described with reference to FIGS. 3 and 4.

An electrolytic cell 200 for the apparatus shown in FIGS. 3 and 4, comprises an external housing 201 having a plurality of radiating fins 201a for dissipating a heat during an electrolysis formed parallel in a longitudinal direction, an internal housing 202 being contacted to a lower wall of the external housing 201, a negative and a positive electrodes 203 and 204 mounted inside right and left side walls of the internal housing 202, being parallel in the longitudinal direction, and a plurality of negative and positive plates 205 and 206 electrically parallel connected to the negative and the positive electrodes 203 and 204, respectively to perform the electrolysis of electrolyte charged within the internal housing 202 so as to generate the oxygen/hydrogen mixture gas.

The negative plates 205 and the positive plates 206 are alternately mounted, being connected to the negative electrode 203 and the positive electrode 204, respectively.

The electrolytic cell 200 is also provided with a temperature sensor for detecting temperature of the electrolyte, an electronic valve which opens when the temperature of the electrolyte is increased above a predetermined value, and an electrolyte circulation pump, thereby maintaining the electrolyte under the predetermined level.

However, the electrolytic cell 200 constructed in this manner must have an operating power source having a lower voltage level and a higher current level, since the negative and the positive plates 205 and 206 are electrically connected to the negative and the positive electrodes 203 and 204, respectively, in a parallel connection.

SUMMARY OF THE INVENTION

It is, therefore, a primary object of the invention to provide an apparatus for generating a mixture gas of oxygen and hydrogen wherein a cooling unit for actively regulating temperature of an electrolyte is provided and electrolysis is made on overall surface of electrode plates connected in series manner, thereby having an increased productivity of the mixture of the oxygen/hydrogen and removing a possibility of leakage problem of the electrolyte.

In order to achieve the object, the present invention provides an apparatus for generating a mixture of oxygen gas and hydrogen gas is provided with an electrolytic cell in which electrolysis of electrolyte therein is performed to generate the mixture of the oxygen and the hydrogen gas by electricity being applied from an electrical conversion device and having a plurality of electrode plates arranged with separation, a insulating materials attached to inner wall surfaces of the electrolytic cell and having at least one surface grooves formed thereon into which the electrode plates are inserted, a water supply device for supplementing the water into the electrolytic cell, the water supply device connected to the electrolytic cell, a gas reservoir for restoring the mixture generated in the electrolytic cell, the gas reservoir connected to the electrolytic cell, and a cooling unit for maintaining temperature inside the electrolytic cell constant connected to the electrolytic cell.

BRIEF DESCRIPTION OF THE DRAWINGS

The above and other objects and features of the instant invention will become apparent from the following description of preferred embodiments taken in conjunction with the accompanying drawings, in which:

FIG. 6b represents a top sectional view of FIG. 6a.

FIG. 7 shows an exploded perspective view of arrangements of electrode plates of the electrolytic cell shown in FIG. 6a;

FIG. 8b depicts a side sectional view of FIG. 8a.

DETAILED DESCRIPTION OF THE PREFERRED EMBODIMENTS

A preferred embodiment of the present invention is described with reference to accompanying drawings.

Figure 1:
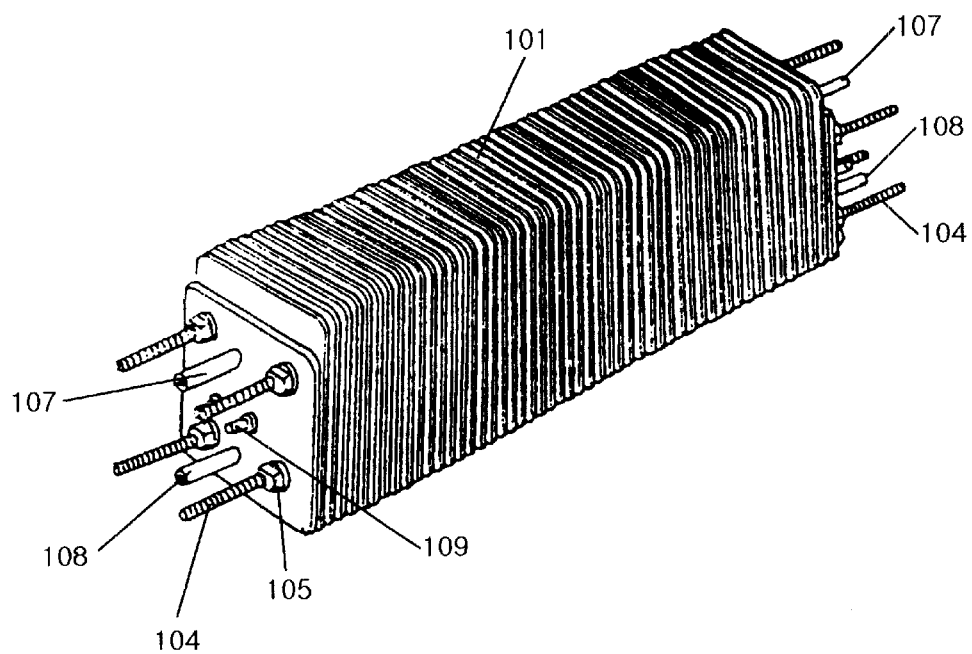
FIG. 1 illustrates a perspective view of an electrolytic cell of one of the prior art gas generation apparatuses.
Figure 2A:
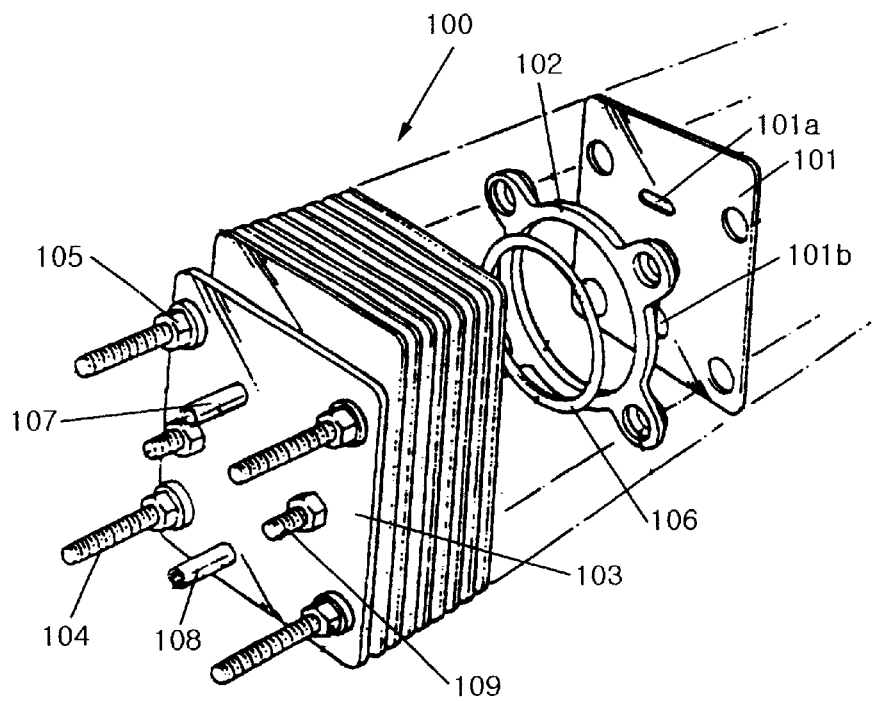
FIG. 2a shows a partial assembled view of the cell shown in FIG. 1.
Figure 2B:
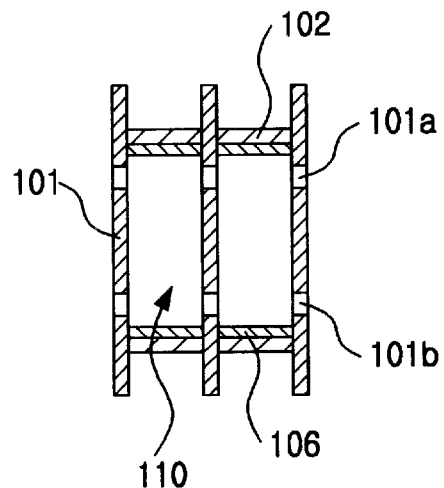
FIGS. 2b and 2c show partial enlarged views of FIG. 2a, respectively.
Figure 2C:
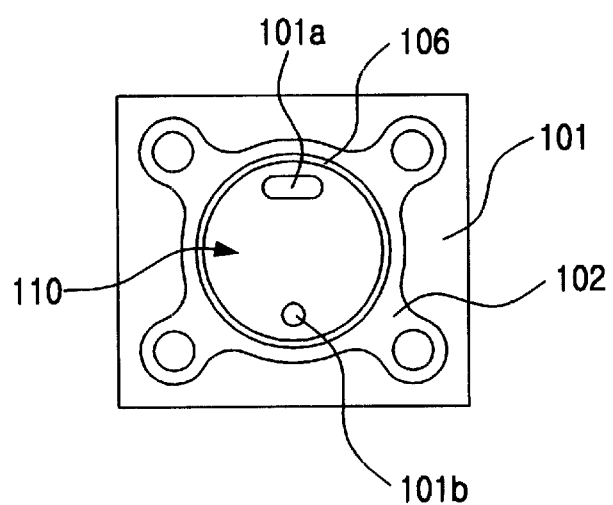
Figure 3:
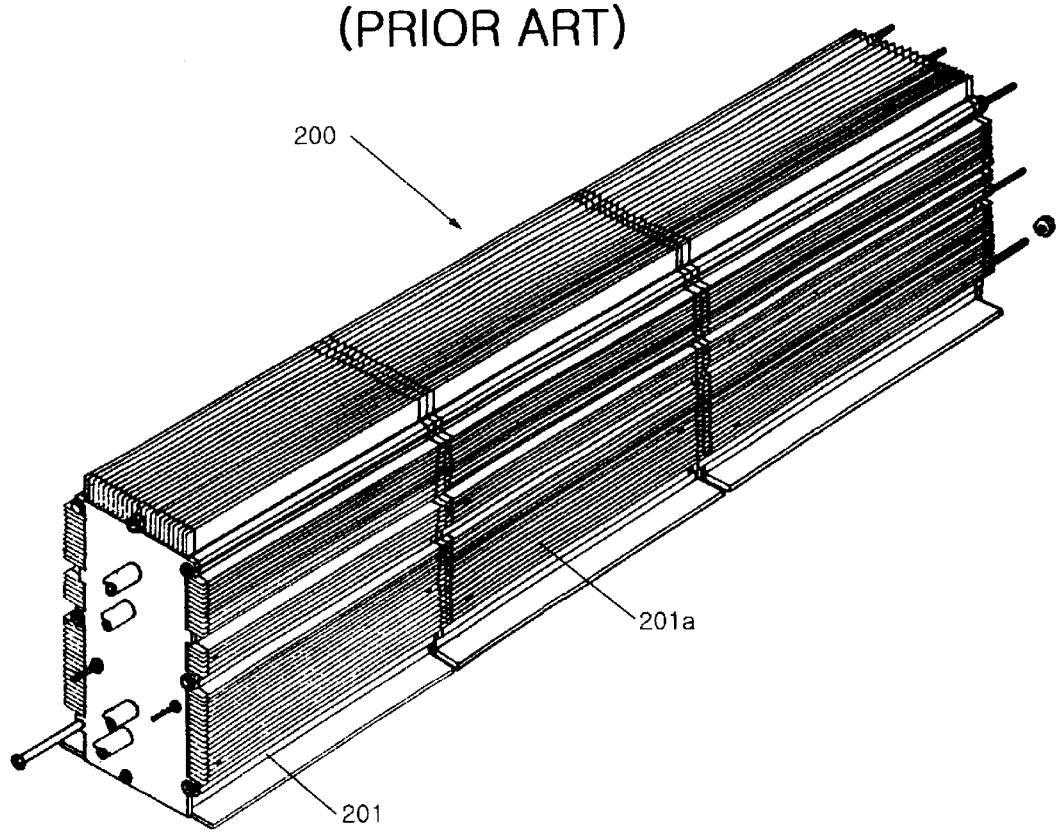
FIG. 3 depicts a perspective view of an electrolytic cell of another of the prior art gas generation apparatuses.
Figure 4:
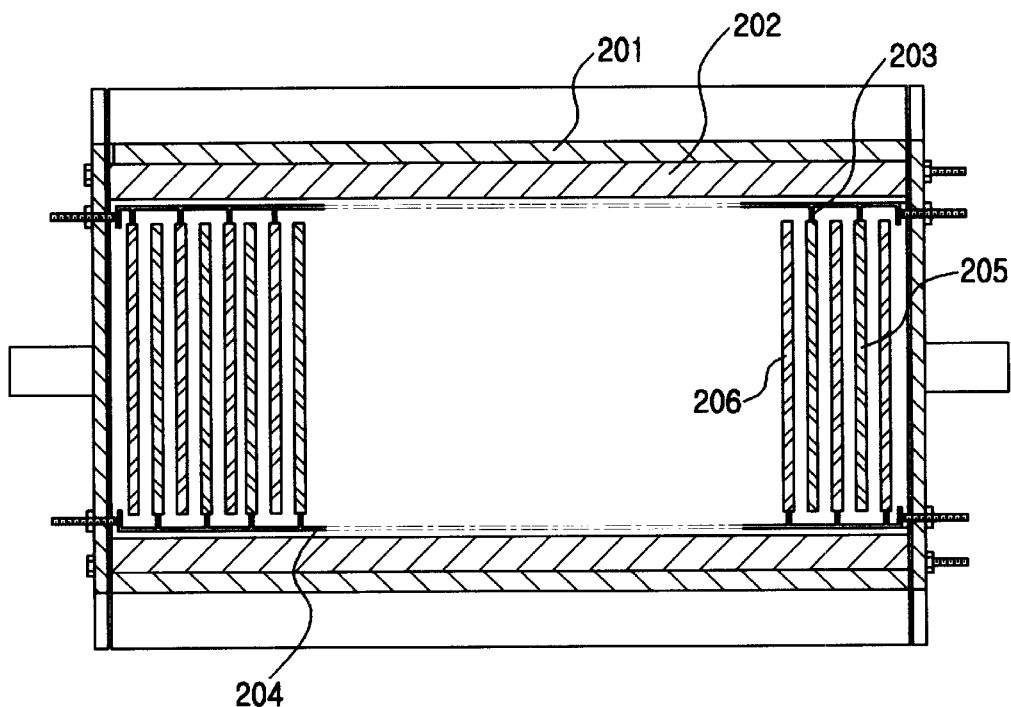
FIG. 4 depicts a sectional view of inside of the cell shown in FIG. 3.
Figure 5:
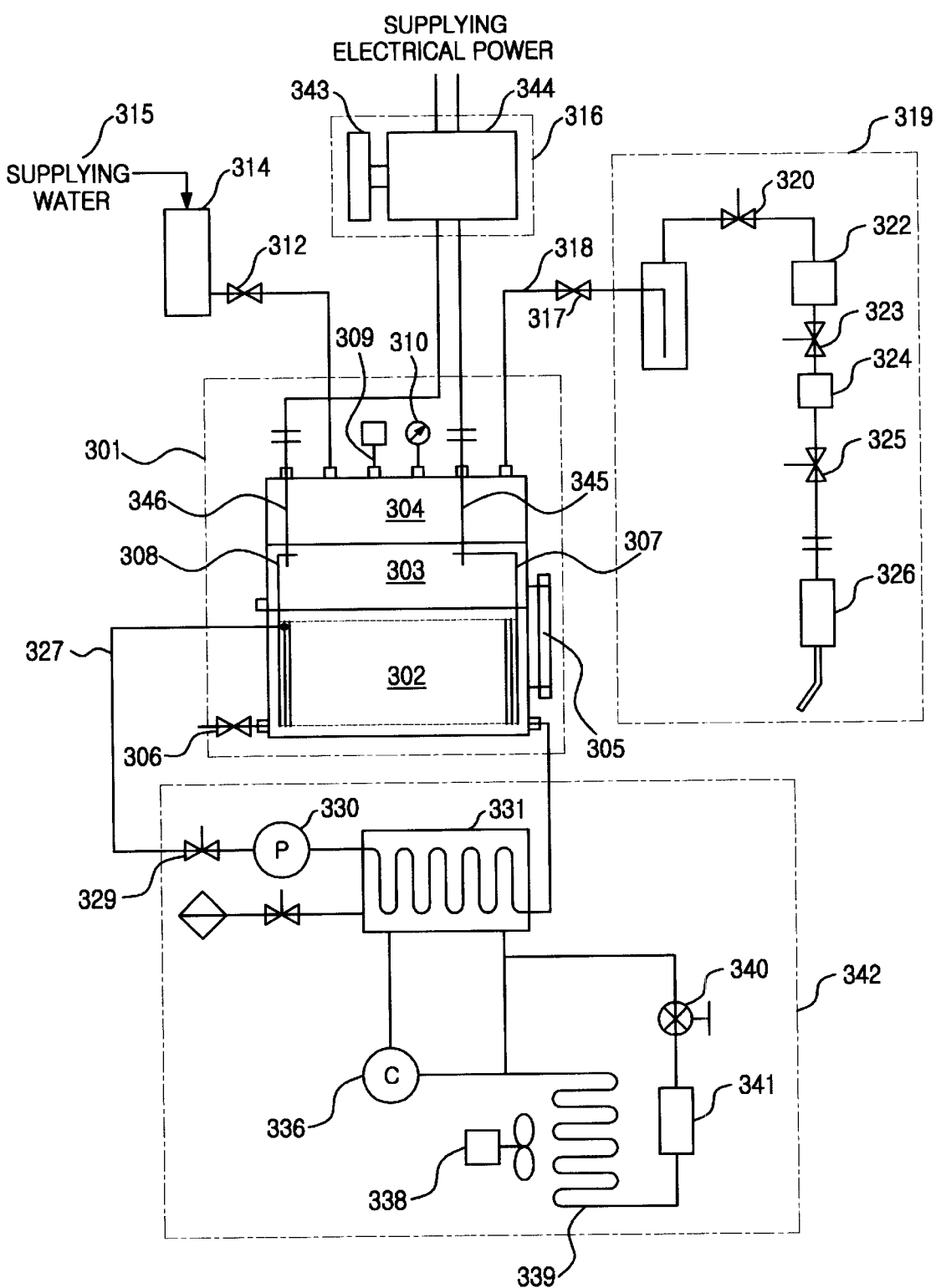
FIG. 5 presents a schematic view of a preferred embodiment of an apparatus for generating a mixture gas of oxygen and hydrogen in accordance with the present invention.

As shown in FIG. 5, the inventive apparatus comprises an electrical conversion device 316 provided with a negative electrode and a positive electrode 345 and 346; an electrolytic cell 301 in which a mixture of oxygen and hydrogen gases is generated by electrolysis of water and is restored, when electricity is applied by the electrical conversion device 316 through the negative and the positive electrodes 345 and 346; a water supply device 314 for supplementing the water to the electrolytic cell 301; a gas supply device 319 for restoring and consuming the mixture gas supplied from the electrolytic cell 301; and a cooling unit 342 for maintaining temperature within the electrolyte cell 301 constant.

The electrical conversion device 316 includes a control board and a control panel 344 and 343 for controlling the whole operation of the components described above.

Figure 6A:
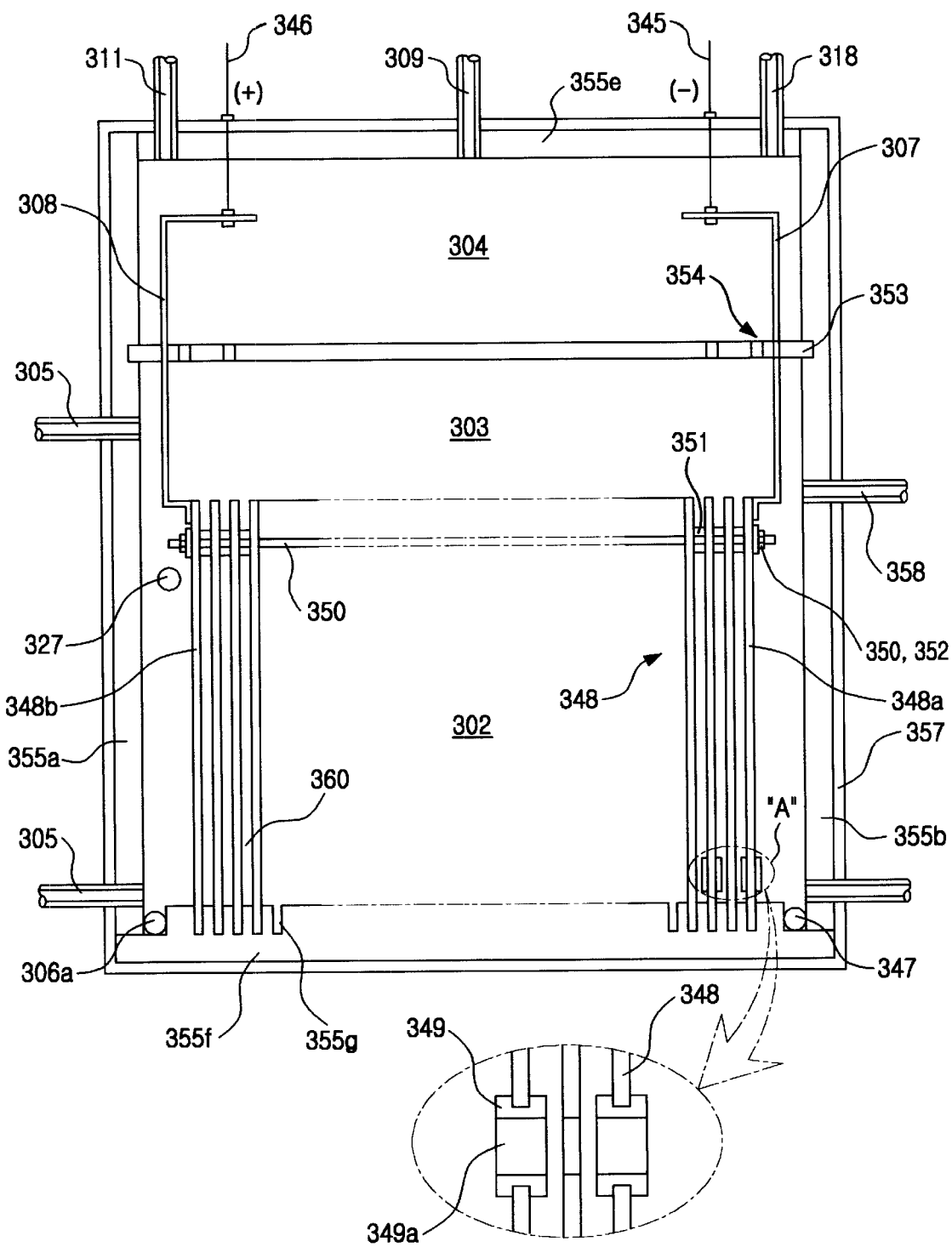
FIG. 6a illustrates a frontal sectional view of a preferred embodiment of an electrolytic cell of the inventive apparatus.
Figure 6B:
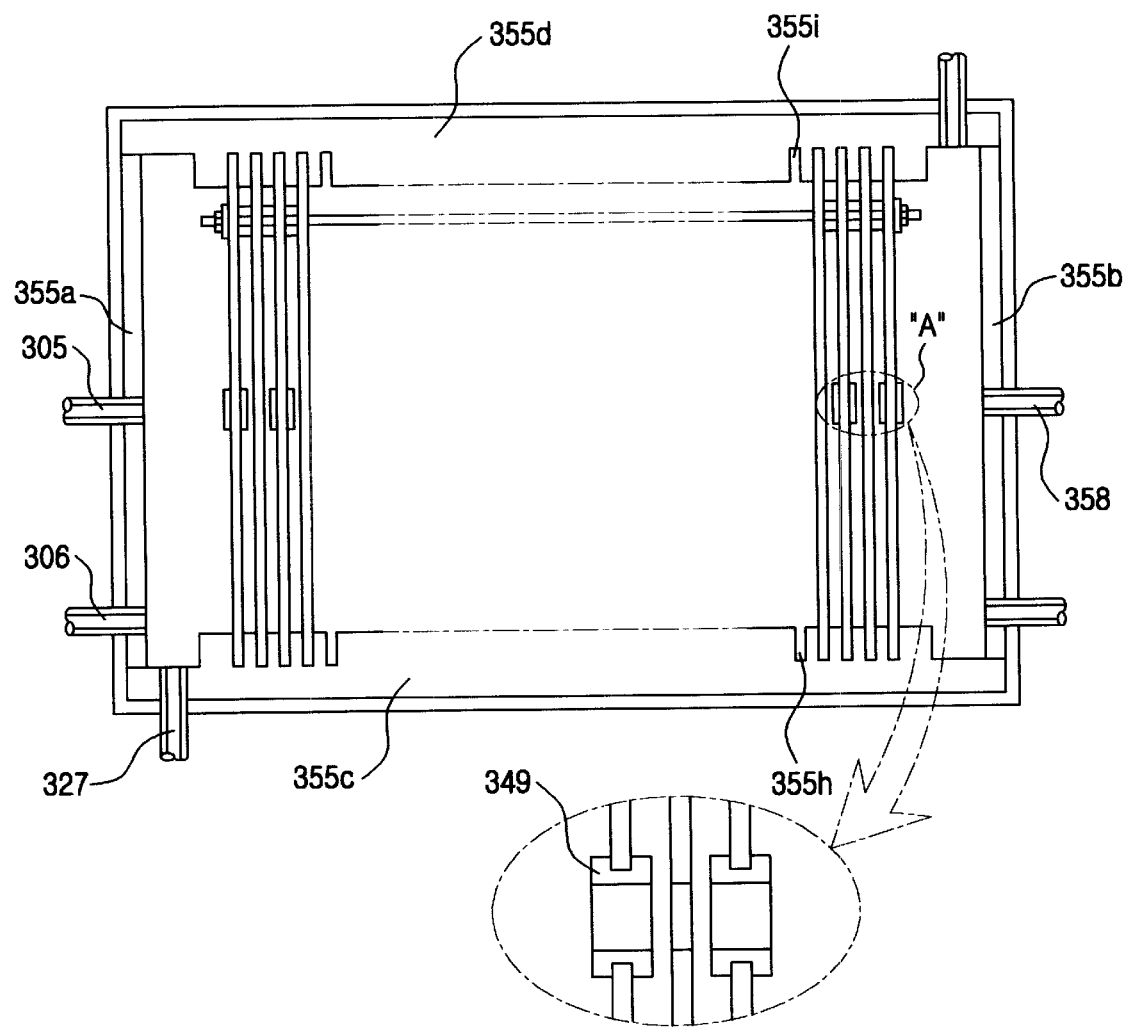

As shown in FIGS. 6a and 6b, the electrolytic cell 301 includes a main body 357 of a box-shape; corrosion-resistant insulating material 355a through 355f positioned on frontal, rear, right-side, left-side, upper and bottom surface inside the main body 357 and made of rubber or synthetic resin; an electrolytic chamber 302 defined with a lower inner space of the main body 357 and charged with the electrolyte 360 having a predetermined level; a plurality of fixing grooves 355g through 355i formed on inner surface of the insulating materials 355c, 355d and 355f, respectively which are positioned on the right-side surface, the left-side surface and the bottom surface of the electrolytic chamber 302; a plurality of electrode plates 348 fixed in such a manner that both lateral ends and a bottom end of each of the electrode plates 348 are inserted into the fixing grooves 355g, 355h and 355i of the insulating materials 355c, 355d and 355f, respectively; a mixing chamber 303 defined with a space above the electrolytic chamber 302 in which the oxygen gas and the hydrogen gas are mixed; a stabilizing plate 353 mounted on an upper portion of the mixing chamber 303 and having a plurality of exhaust holes 354; and a collecting chamber 304 for collecting the oxygen/hydrogen mixture gas mixed in the mixing chamber 303 defined with a space between the stabilizing plate 353 and an upper surface of the main body 357.

The electrolytic chamber 302 is provided with a level gage 305 having a sensor for detecting the level of the electrolyte. Mounted on one side of the upper surface of the collecting chamber 304 is a pressure sensor 310 for detecting pressure of the mixture of the oxygen and the hydrogen gases within the electrolytic cell 301. Mounted on the other side of the upper surface of the collecting chamber 304 is a temperature sensor 309 for detecting the temperature of the electrolytic cell 301.

The electrolytic chamber 302 communicates with the cooling unit 342 via a circulation tube 327 and a return tube 347 and has a drain valve 306 at its bottom portion and a water supply sensor 358 at its upper portion.

A water supply tube 311 for supplying the water and a gas supply tube 318 for sending the mixture of the oxygen/hydrogen gases to a gas consumption portion 319 are connected to the upper portion of the collecting chamber 304.

Figure 7:
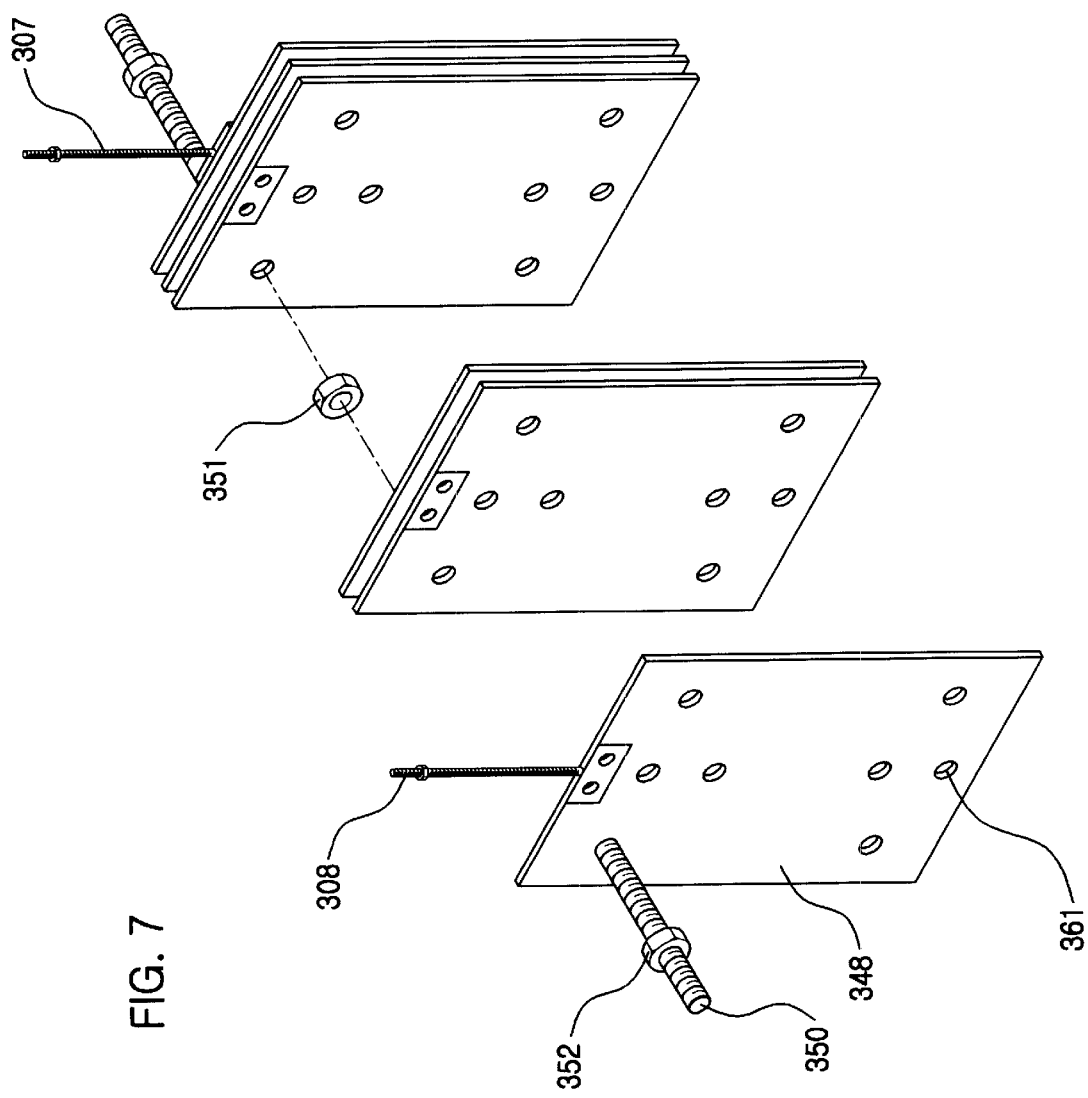

As shown in FIGS. 6a and 7, the electrode plates 348 and the O-ring 351 are alternately positioned and fixed by clamping the nut 352 around the bolt 350. The pair of termination plates 348a and 348b positioned externally of both ends of the electrode plates 348 are connected to the negative and the positive electrodes 345 and 346 via a negative and a positive terminals 307 and 308.

The electrode plates 348 has an electrolyte passing hole 361 formed through the electrode plate 348. A protect ring 349 having a corrosion-resistant property is mounted along an inner periphery of the electrolyte passing hole 361.

As shown in FIG. 5, the cooling unit of one of conventional units includes a circulation pump 330 for circulating the electrolyte 360 in the electrolytic chamber 302, a circulation valve 329 for controlling a flow rate of the circulating electrolyte 360, a cooling chamber 331 for cooling the circulating electrolyte 360 by the circulation pump 330, a compressor 336 for compressing the coolant vaporized in the cooling chamber 331, a cooling fan 338 for condensing the compressed coolant, a filter drier 341 for separating the condensed coolant into a gaseous component and the liquid component, and an auto-expansion valve 340 for performing a rapid expansion of the liquid coolant into a spray condition.

As shown in FIG. 5, the gas supply device 319 is connected to the collecting chamber 304 and is provided with a gas tank 359 having a flame-trap function, a combustor 326 for performing a combustion of the mixture gas of the oxygen/hydrogen from the gas tank 359, a plurality of flame traps 322 and 324 and a plurality of valves 320, 323 and 325 mounted on a supply line connecting the gas tank 359 and the combustor 326.

The operation of the inventive gas generation apparatus constructed in this manner will be described hereinbelow in detail.

When the power switch is turned on, the electricity is supplied to the electrical conversion device 316 and the control board 344 starts to operate. Then, via setting the operative environment by using a variety of switches mounted on the control panel 343, the apparatus is operated in the following manner.

When the electricity is applied to the negative terminal 307 and the positive terminal 308, the oxygen gas and the hydrogen gas are generated in a ratio of 2:1 on a molal basis. The mixture of the oxygen and the hydrogen gases are evenly mixed in the mixing chamber 303 and then are introduced into the collecting chamber 304. At this time, since the mixture of the oxygen and the hydrogen gases is introduce into the collecting chamber 304 via the exhaust holes 354 formed through the stabilizing plat 353, bubble occurring when the oxygen gas and the hydrogen gas are mixed may be reduced and introducing the bubble into the collecting chamber 304 may be prevented. Further, the insulating materials 355 of the rubber or synthetic resin positioned inside the electrolytic cell 301 may reduce the consumption of the electricity and prevent the corrosion of the electrolytic cell 301.

The pressure of the mixture gas collected in the collecting chamber 304 is detected by the pressure sensor 310. When the pressure exceeds the predetermined level, a gas valve 317 mounted to the gas supply tube 318 is opened and the mixture of the oxygen and the hydrogen gases is charged in the gas tank 359. The charged mixture gas is sent to the gas combustor 326 to be consumed whenever the valves 320 are opened. In this situation, since the flame trap 322 and 324 are mounted between the gas tank 359 and the gas combustor 326, a reversed flame movement to the gas tank 359 may be prevented.

Meanwhile, when the temperature sensor 309 detects an excess of the temperature increase beyond the predetermined level after the electrolysis has been started, the circulation pump 330 starts to operate to circulate the electrolyte in the electrolytic chamber 302. Since the electrolyte is cooled in the cooling chamber 331 and then is supplied again to the electrolytic chamber 302, the temperature of the electrolytic cell 301 is maintained under the predetermined level.

In this regard, in the inventive gas generation apparatus, the mixture gas can be continuously generated regardless of the operation time period. Further, the efficiency of the electrolysis may be increased and life time of the components of the apparatus may be lengthened, since a proper temperature can be always provided.

When the level of the electrolytic cell 301 is lowered than the predetermined value due to the water consumption during the electrolysis, it is detected by the water supply sensor 358 and then the water supply valve 312 is opened to allow the water contained within the water supply tank 314 to be automatically supplied to the electrolytic cell 301. When the level gage 305 having the sensor detects the completion of the water supply by a predetermined value, the water supply is stopped by the water supply valve 312 to maintain the level of the electrolytic cell 301 constant.

On the other hand, although, since both lateral ends and the bottom end of each of the electrode plates 348 are inserted into the fixing grooves 355, the plurality of the electrolyte passing holes 361 are formed through the electrode plate 348 for the circulation of the electrolyte in the preferred embodiment described above, changing the arrangements of the electrode plates may enable the circulation of the electrolyte without forming the electrolyte passing hole 316 through the electrode plate.

Figure 8A:
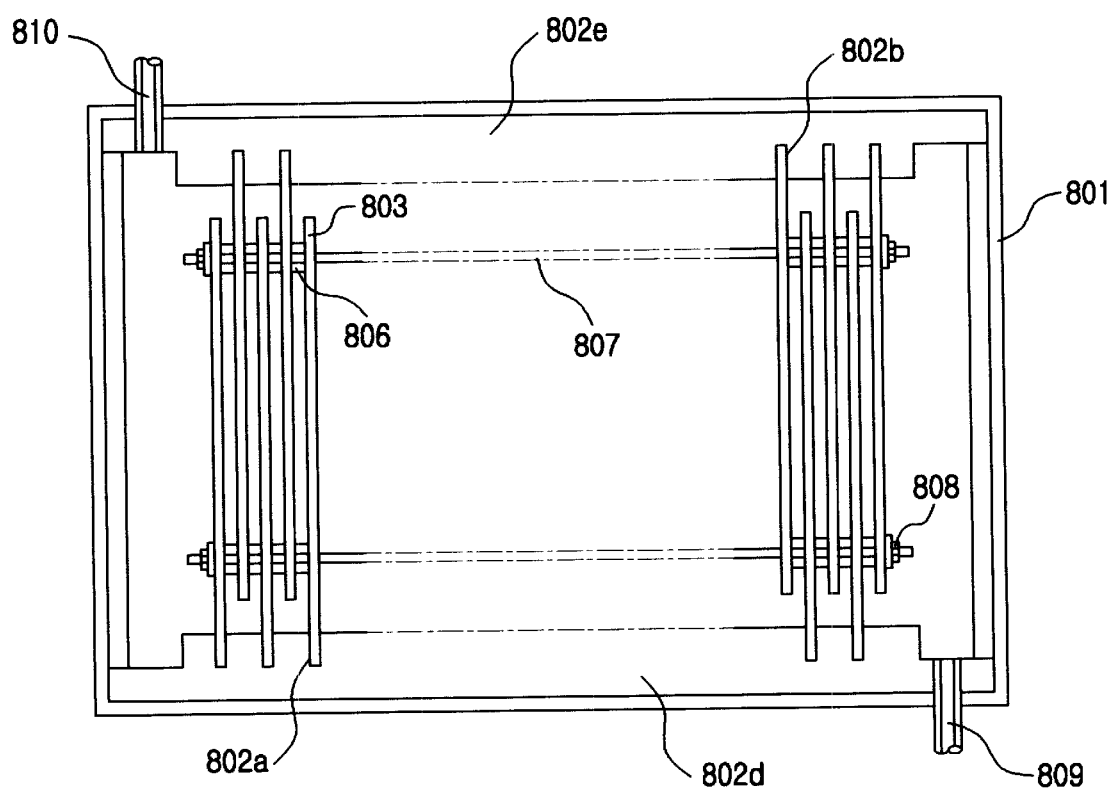
FIG. 8a depicts a top sectional view of another embodiment of the electrolytic cell of the inventive apparatus.
Figure 8B:
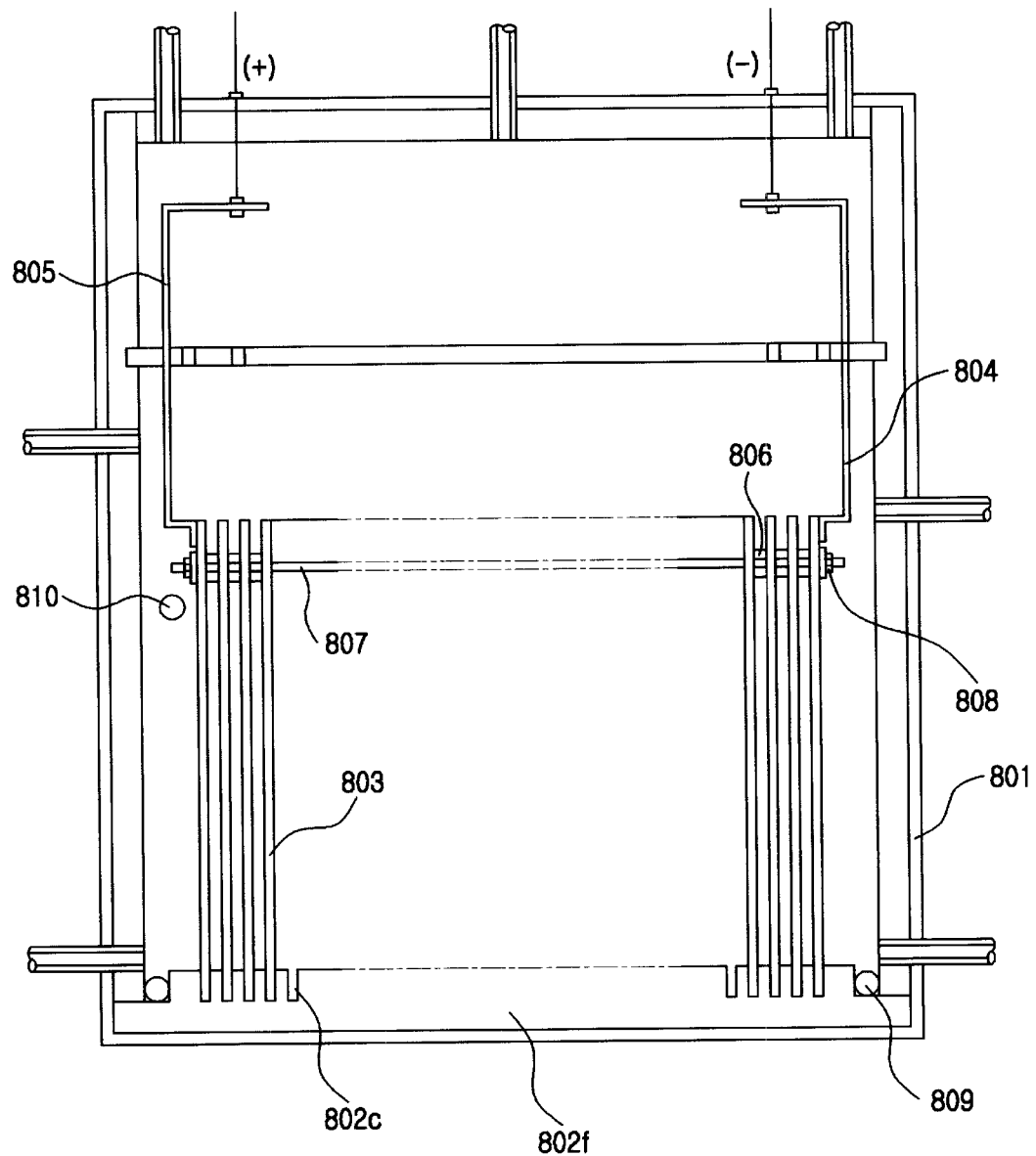

FIGS. 8a and 8b depict a top sectional view and a side sectional view of another embodiment of the electrolytic cell of the inventive apparatus, respectively, wherein the electrode plates are mounted in such a manner that, e.g., the first electrode plate is biased in one direction, with the second one biased in the opposite direction.

As shown, the electrolytic cell in this embodiment includes a main body 801 of a box-shape; corrosion-resistant insulating materials 802d, 802e and 802f positioned on right-side, left-side and bottom surface inside the main body 801 and made of rubber or synthetic resin, a plurality of fixing grooves 802a, 802b and 802c formed on inner surfaces of the insulating materials 802d, 802e and 802f, respectively; a plurality of electrode plates 803 fixed in such a manner that one lateral end of each of the electrode plates 348 is alternately inserted into the fixing groove 802a of the insulating material 802d or the fixing groove 802b of the insulating material 802e, with a bottom end of each of the electrode plates 348 being inserted into the fixing groove 802c of the insulating material 802f; and a negative terminal 804 and a positive terminal 805 for applying the current to the electrode plates 803.

The electrode plate 803 and an O-ring 806 are alternately laminated and fixed by clamping the nuts 808 around the plurality of bolts 807.

The main body 801 is connected to a return tube 809 at its bottom portion, through which the electrolyte cooled in the cooling unit(not shown) is supplied and is connected to a circulation tube 810 at its upper portion, through which the electrolyte is supplied to the cooling unit.

In the electrolytic cell constructed in this manner, when the temperature within the electrolyte is increased due to the electrolysis, the cooled electrolyte is supplied through the return tube 809 to the electrolytic cell, with the electrolyte in the electrolytic cell being supplied to the cooling unit via the circulation tube 810 at the same time.

Since a passage or a gap is made between one of the electrode plates 803 and one of the insulating materials 802d and 802e, the electrolyte introduced via the return tube 809 can properly circulate within the electrolytic cell. Since the electrolyte flows into all spaces between the electrode plates 803, the temperature inside the electrolytic cell can be maintained constant.

In accordance with the present invention, the plurality of electrode plates are mounted inside the electrolytic cell insulated with the insulating materials, being submerged under the electrolyte, the cooling unit being provided to maintain the temperature of the electrolytic cell constant, thereby enabling an efficient use of the area of the electrode plate, reducing the energy consumption and preventing the corrosion of the electrolytic cell. The inventive gas generation apparatus is simple in configuration and is not expensive, enabling a mass production. Further, the capacity of the inventive gas generation apparatus can be easily increased. Furthermore, in the inventive gas generation apparatus, the efficiency of the electrolysis and the amount of the generated mixture gas may be increased.

Although the invention has been shown and described with respect to the preferred embodiments, it will be understood by those skilled in the art that various changes and modifications may be made without departing from the spirit and scope of the invention as defined in the following claims.

What is claimed is:

1. An apparatus for generating a mixture of oxygen gas and hydrogen gas comprising:

an electrolytic cell in which electrolysis of electrolyte therein is performed to generate the mixture of the oxygen and the hydrogen gas by electricity being applied from an electrical conversion device and having a plurality of electrode plates arranged with a predetermined separation, said electrolytic cell further including a pressure detection means for detecting pressure of the mixture of the oxygen gas and the hydrogen gas collected together;

an insulating means attached to inner wall surfaces of the electrolytic cell and having at least one surface grooves formed thereon into which the electrode plates are inserted;

a water supply means for supplementing the water into the electrolytic cell, the water supply means connected to the electrolytic cell;

a gas reservoir means for restoring the mixture generated in the electrolytic cell, the gas reservoir means including a gas valve that opens in response to signals from the pressure detection means, thereby controlling the pressure in the electrolytic cell, the gas reservoir means connected to the electrolytic cell; and a cooling means for maintaining temperature inside the electrolytic cell constant connected to the electrolytic cell.

2. The apparatus of claim 1, wherein said electrolytic cell further has a level detection means for detecting level of the electrolyte within the electrolytic cell, and the water supply means has a water supply valve which opens in response to signals from the level detection means, thereby controlling the level of the electrolyte within the electrolytic cell.

3. The apparatus of claim 1, wherein said electrolytic cell includes:

a main body of a box-shape;

an electrolytic chamber defined with a lower inner space of the main body and charged with the electrolyte;

a plurality of electrode plates through which fixing bolts pass, being spaced by a predetermined gap and fixed in such a manner that at least one end of both lateral ends and an upper and a lower ends is inserted into the grooves of the insulating means; and a negative terminal and a positive terminal for applying the current to the electrode plates, connected to a negative and a positive electrodes, respectively.

4. The apparatus of claim 3, wherein at least one electrolyte passing hole for circulating the electrolyte to maintain the temperature of the electrolyte constant is formed through a predetermined portion of the electrode plate.

5. The apparatus of claim 4, wherein said electrode plate has a protect ring having a corrosion-resistant property is mounted along an inner periphery of the electrolyte passing hole.

6. The apparatus of claim 5, wherein said electrolytic cell further includes:

a mixing chamber defined with a space above the electrolytic chamber in which the oxygen gas and the hydrogen gas are mixed; and a collecting chamber for collecting the oxygen/hydrogen mixture gas mixed in the mixing chamber defined with a space above the mixing chamber.

7. The apparatus of claim 6, wherein the electrolytic cell further includes a stabilizing plate mounted between the mixing chamber and the collecting chamber to divide them into two parts and having a plurality of exhaust holes for preventing an introduction of bubble into the collecting chamber.

8. The apparatus of claim 4, wherein said electrolytic cell further includes:

a mixing chamber defined with a space above the electrolytic chamber in which the oxygen gas and the hydrogen gas are mixed; and a collecting chamber for collecting the oxygen/hydrogen mixture gas mixed in the mixing chamber defined with a space above the mixing chamber.

9. The apparatus of claim 8, wherein the electrolytic cell further includes a stabilizing plate mounted between the mixing chamber and the collecting chamber to divide them into two parts and having a plurality of exhaust holes for preventing an introduction of bubble into the collecting chamber.

10. The apparatus of claim 3, wherein the plurality of electrode plates is fixed in such a manner that one lateral end of each of the electrode plates is alternately inserted into the groove on a surface of one of the insulating means attache to inside of the electrolytic cell or the groove on a surface of the insulating means opposite to said one of the insulating means, thereby allowing all spaces between the electrode plates to be communicated.

11. The apparatus of claim 10, wherein said electrolytic cell further includes:

a mixing chamber defined with a space above the electrolytic chamber in which the oxygen gas and the hydrogen gas are mixed; and a collecting chamber for collecting the oxygen/hydrogen mixture gas mixed in the mixing chamber defined with a space above the mixing chamber.

12. The apparatus of claim 11, wherein the electrolytic cell further includes a stabilizing plate mounted between the mixing chamber and the collecting chamber to divide them into two parts and having a plurality of exhaust holes for preventing an introduction of bubble into the collecting chamber.

13. The apparatus of claim 3, wherein said electrolytic cell further includes:

a mixing chamber defined with a space above the electrolytic chamber in which the oxygen gas and the hydrogen gas are mixed; and a collecting chamber for collecting the oxygen/hydrogen mixture gas mixed in the mixing chamber defined with a space above the mixing chamber.

14. The apparatus of claim 13, wherein the electrolytic cell further includes a stabilizing plate mounted between the mixing chamber and the collecting chamber to divide them into two parts and having a plurality of exhaust holes for preventing an introduction of bubble into the collecting chamber.

15. The apparatus of claim 1, wherein the cooling means further includes a temperature sensor for detecting the temperature of the electrolyte within the electrolytic cell.

16. The apparatus of claim 15, wherein the cooling means includes:

a circulation tube connected to one portion of the electrolytic cell and other portion of the electrolytic cell;

a circulation pump for circulating the electrolyte, the circulation pump being operated when the temperature inside the electrolytic cell exceeds a predetermined level and mounted on the circulation tube;

a circulation valve which is opened and closed to permit the circulation of the electrolyte and stopping the circulation of the electrolyte, respectively, according to the temperature inside the electrolytic cell; and a cooler for cooling the electrolyte being circulated, the cooler mounted on the circulation tube.

17. The apparatus of claim 1, wherein the cooling means includes:
- a circulation tube connected to one portion of the electrolytic cell and other portion of the electrolytic cell;
- a circulation pump for circulating the electrolyte, the circulation pump being operated when the temperature inside the electrolytic cell exceeds a predetermined level and mounted on the circulation tube;
- a circulation valve which is opened and closed to permit the circulation of the electrolyte and stopping the circulation of the electrolyte, respectively, according to the temperature inside the electrolytic cell; and
- a cooler for cooling the electrolyte being circulated, the cooler mounted on the circulation tube.

18. The apparatus of claim 1, wherein a plurality of flame traps are mounted to a tube between the gas tank and a gas combustor, in order to prevent a reversed flame movement to the gas tank.

* * * * *